United States Patent
Dion et al.

[15] 3,702,497
[45] Nov. 14, 1972

[54] MANUFACTURE OF CLAD METALS

[72] Inventors: Paul A. Dion; Paul O. Hagarman, both of North Attleboro, Mass.

[73] Assignee: Polymetallurgical Corp., Attleboro, Mass.

[22] Filed: Jan. 7, 1971

[21] Appl. No.: 104,701

[52] U.S. Cl. ............... 29/474.3, 29/473.3, 29/480, 72/256
[51] Int. Cl. ............................................ B21d 39/04
[58] Field of Search .......... 29/473.3, 474.6, 475, 480, 29/474.3; 72/256

[56] References Cited

UNITED STATES PATENTS

| 1,741,812 | 12/1929 | Boynton | 29/473.3 X |
| 1,866,145 | 7/1932 | Wilson | 29/473.3 |
| 3,096,577 | 7/1963 | Carlson et al. | 29/473.3 |
| 3,320,666 | 5/1967 | Dion | 29/473.3 |
| 3,372,467 | 3/1968 | Crowdes | 29/473.3 X |
| 3,389,455 | 6/1968 | Clark | 29/473.3 X |
| 3,600,790 | 8/1971 | Dion et al. | 29/473.3 X |

Primary Examiner—J. Spencer Overholser
Assistant Examiner—Richard Bernard Lazarus
Attorney—Chittick, Pfund, Birch, Samuels & Gauthier

[57] ABSTRACT

A continuous process for cladding a metal core rod with a dissimilar metal sheath. Contaminants are removed from the periphery of a moving length of core rod. While the core rod is maintained contaminant-free, a thin annular sheath of cladding metal is extrusion bonded around the periphery of the core rod to produce a clad rod suitable for subsequent drawing into wire without the need for sintering, metal removal or other finishing operations on the clad rod.

12 Claims, 5 Drawing Figures

PATENTED NOV 14 1972

INVENTORS
PAUL A. DION
PAUL O. HAGARMAN

BY *Chittick, Pfund,
Birch, Samuels & Gauthier*

ATTORNEYS

PATENTED NOV 14 1972 3,702,497

INVENTORS
PAUL A. DION
PAUL O. HAGARMAN

BY Chittick, Pfund,
Birch, Samuels & Gauthier
ATTORNEYS 3,702,497

MANUFACTURE OF CLAD METALS

BRIEF SUMMARY OF THE INVENTION

This invention is a process for producing a clad rod having a round metal core and a dissimilar thin metal cladding. The preferred embodiment of this invention utilizes tin clad aluminum. However, many other metals can be satisfactorily substituted for both the metal core and the metal cladding.

The preferred tin clad aluminum line employs a pay-off reel issuing a continuous moving length of round aluminum core rod. The aluminum core rod is optionally longitudinally scored by a peripheral gang assembly of scoring rolls and the oily rod surface is cut away by a rotary hollow mill to expose virgin rod surface.

The core rod is maintained contaminant-free as it is moved into the central aperture of a cylinder block. Ram means are provided in the cylinders of the cylinder block to drive heated tin through delivery passageways into the cylinder block central aperture. An annular metering die forms the downstream portion of the central aperture and the hot tin is extruded through the die and bonded around the periphery of the core rod.

The bonded tin cladding metal and the aluminum core rod are brought to substantially equal temperatures by virtue of their intimate contact. The tin clad aluminum composite is then pulled into a roll stand having two pairs of powered reducing rolls where the solid-phase bond is improved and the clad rod diameter is reduced. The clad rod is then coiled, ready to be drawn into wire.

DETAILED DESCRIPTION OF THE PREFERRED EMBODIMENT

Figure 1:
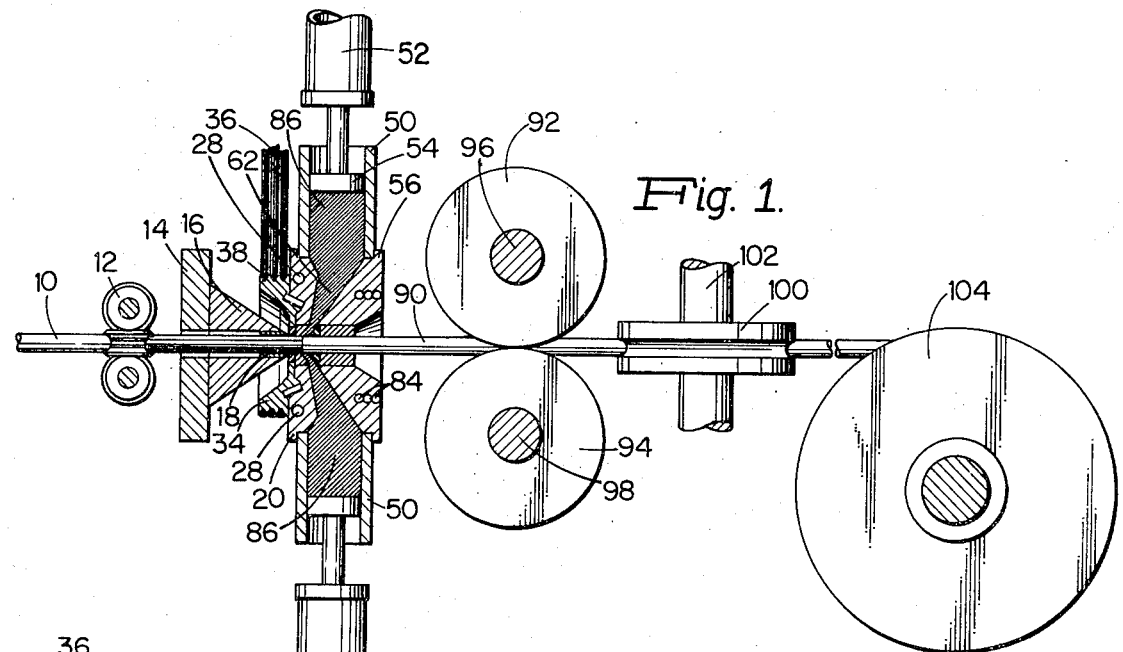
FIG. 1 is a schematic diagram (omitting details) of the tin clad aluminum line of the preferred embodiment of this invention.

FIG. 1 shows the tin clad aluminum line which is the preferred embodiment of this invention. Aluminum core rod 10 issues from a pay-off coil at approximately 100 ft/min. The core rod is pre-sized at, for example, 0.610 inches diameter.

As aluminum core rod 10 moves downstream at approximately room temperature, it undergoes its first operation which is entirely optional. A gang assembly of scoring rolls 12 rolls longitudinal score lines into the surface of core rod 10 for the purpose of ensuring a uniform short chip length at the subsequent hollow milling operation. Short chips are easy to clear and don't become tangled in the machinery. The score lines can be longitudinal, spiral or any other conventional configuration. The four scoring rolls which form gang assembly 12 are disposed 90° apart (when seen in a cross-section view taken through core rod 10) and impart eight longitudinal score lines in the surface of the core rod.

Figure 2:
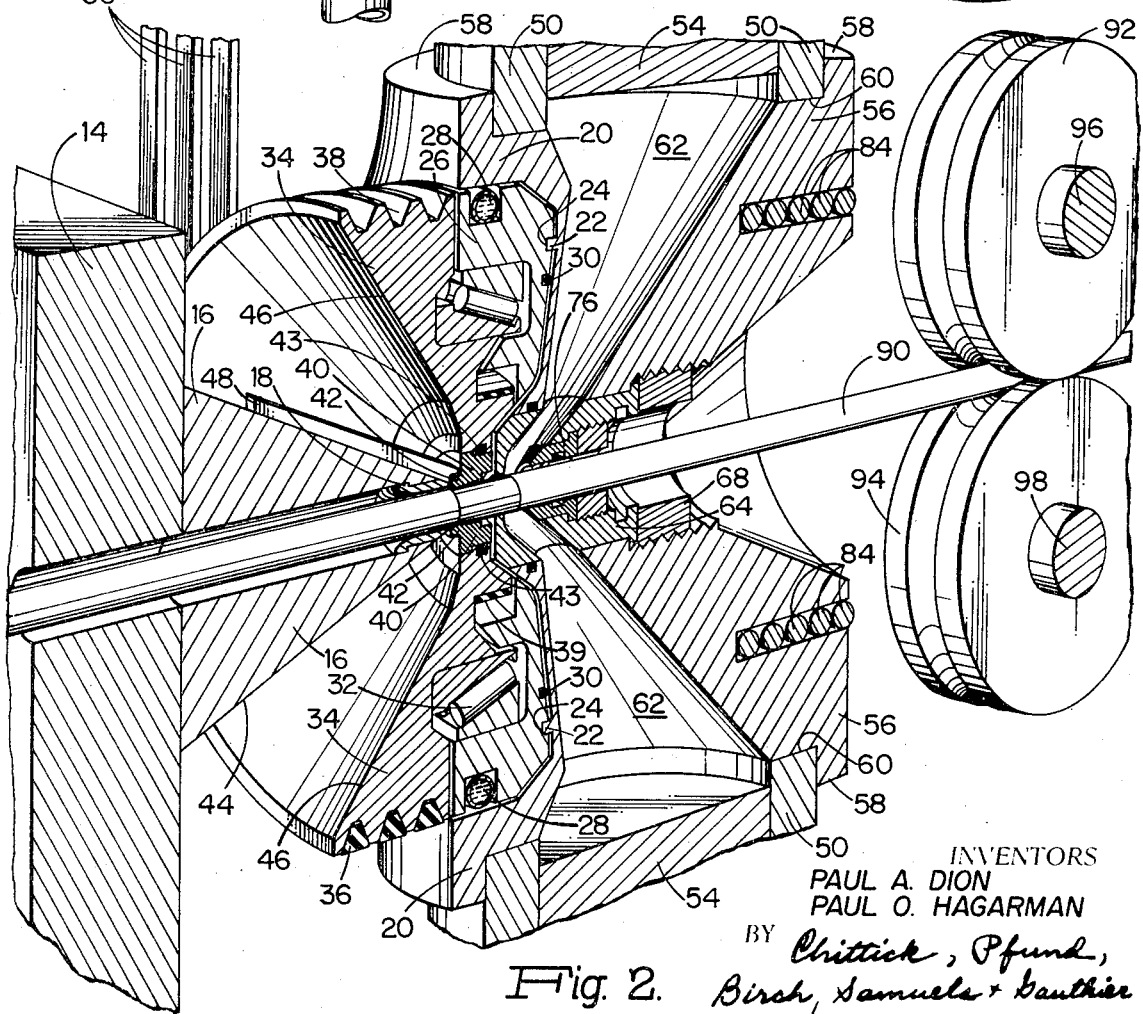
FIG. 2 is a perspective view of the tin clad aluminum line shown in FIG. 1 with the scoring rolls and take-up unit omitted and with the rotary hollow mill and cylinder block shown in detail.
Figure 3:
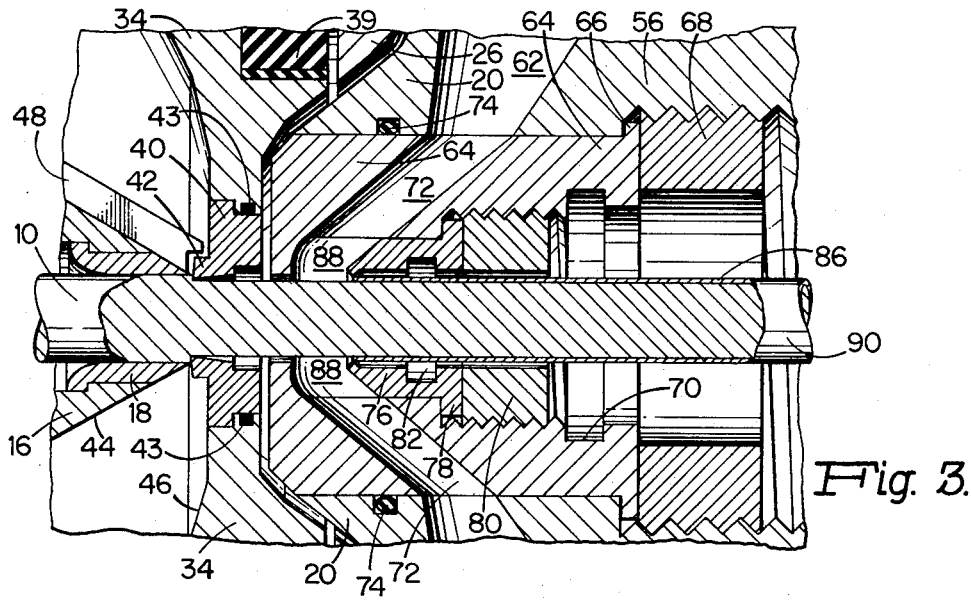
FIG. 3 is a view in section of a small portion of FIG. 1 enlarged to show much greater detail.

After receiving the optional scoring treatment, the aluminum core rod 10 has its oily contaminated surface removed by a hollow milling cutter which is shown in greater detail in FIGS. 2 and 3. Core rod 10 first passes through the cylindrical recesses formed in machine frame 14 and in bushing support 16 which is fixed to machine frame 14. Then, the core rod is centered and supported by guide bushing 18 which is mounted on bushing support 16.

A thick walled cylinder block is best shown in FIGS. 2 and 3. This cylinder block will be described in great detail later. The cylinder block has an upstream wall 20 having a protruding locating ridge 22 which seats in a corresponding ring-like groove 24 formed in a water-cooled insulating partition 26. Cylinder block 20 becomes quite hot during operation and is slightly spaced from the insulating partition except for the contacting ridge 22.

The air space therebetween acts as a thermal barrier and, additionally, water pipes 28 are provided in insulating partition 26 for cooling purposes. Hot water is continuously pumped from the insulating partition to an unshown heat dissipation unit where the water is cooled and then recirculated to partition 26. This water cooling provision maintains insulating partition 26 at approximately 150°–175°F.

To prevent recontamination of the surface of core rod 10 after hollow milling, an O-ring seal 30 is provided between cylinder block wall 20 and insulating partition 26. O-ring seal 30 completely blocks the outside atmosphere from passing between wall 20 and partition 26 to reach the core rod surface.

Insulating partition 26 carries radial thrust bearings 32 which in turn rotatably support hollow mill 34. The hollow mill is driven by an unshown power unit through belt 36 which frictionally engages grooves 38 on hollow mill 34.

A large ring seal 39 is mounted in a recess formed between the rotating hollow mill 34 and the insulating partition 26. Like O-ring seal 30, ring seal 39 completely prevents the outside atmosphere from reaching the core rod surface. Ring seal 39 blocks the passage of atmosphere through the thrust bearings 32.

It will also be understood that the area between seals 30 and 39 and the core rod surface can also optionally be subjected to a vacuum or to a selected non-oxiding gas under pressure in order to maintain the virgin surface of the core rod. The vacuum or non-oxiding gas would be drawn or introduced through a narrow passageway (not shown) drilled through the cylinder block walls.

A rotating cutter head 40 has teeth 42 which cut away the oily contaminated surface of core rod 10. As an example, the original 0.610 inch aluminum rod diameter can be milled to an extremely clean 0.578 inch rod diameter. This cutting action imparts frictional heat to the core rod to bring it up from room temperature to approximately 250°F. An O-ring seal 43 is mounted in a recess formed in hollow mill 34 and completely blocks oil or contaminated atmosphere from passing between the cutter head 40 and the mill 34 to reach the freshly milled core rod surface.

It will be seen in FIG. 2 that the aluminum chips generated by the cutting action of cutter head 40 are thrown out of the annular chip discharge chute formed by the downstream surface 44 of fixed bushing support 16 and the upstream surface 46 of rotating hollow mill 34. The aluminum chips are substantially uniform in length because of the previous scoring operation which reduces the chips' tendency to twist and tangle in the discharge chute or in the adjacent moving machinery. Preferably, an unshown chip deflection cover is mounted adjacent the upper portions of the discharge chute to direct the discharged chips downwardly to a chip collection bin.

An optional chip breaker 48 is carried by the bushing support 16. Chip breaker 48 may be fixed in place or reciprocate longitudinally. Also, there may be one chip breaker or a plurality of chip breakers arranged around the bushing support periphery. The function of chip breaker 48 is to clear chips and to prevent them from clogging the discharge chute.

The milling operation is important in order to obtain a good tin to aluminum bond. However, it will be appreciated that what is important is that a virgin aluminum surface is produced and not necessarily the means by which it is accomplished. The milling operation is highly preferred because it is fast, efficient, compact and produces a very smooth clean surface. Other alternative means could include, by way of example, chemical treatment, mechanical abrasion or die skiving. The preferred embodiment of this invention utilizes a rotating milling cutter which does not re-expose the freshly cut aluminum surface to the oily atmosphere, but rather confines the virgin rod surface to the interior of cutter head 40 until the rod passes into the cylinder block where the tin sheath is extrusion bonded onto the aluminum rod.

In order to extrude the tin cladding sheath over the milled core rod 10, a massive cylinder block is provided around the core rod. The cylinder block has at least one but preferably a plurality of cylinders 50 seated therein. Cylinders 50 are disposed radially with respect to the core rod axis. A recommended number of cylinders is four. A ram 52 is provided in each cylinder 50 and drivably strokes its piston 54 within the cylinder.

The cylinder block, as shown in the cross-sectional views of the drawings, has an upstream wall 20 and a downstream wall 56. Of course, these walls are actually contiguous and form an approximate cylinder as can best be seen in FIG. 2. The cylinder block walls have a circular open end 58 with a recessed inner rim 60 into which cylinder 50 is seated and affixed. A conical delivery passageway 62 is formed internally in the cylinder block and is open at its wider or far end where it is faired into cylinder 50. The narrower or near end of the delivery passageway 62 is disposed adjacent to core rod 10 and opens at the hollow central aperture of the cylinder block.

Into the cylinder block central aperture, a thick-walled cup 64 is seated as is most clearly shown in FIG. 3. Cup 64 has a lip 66 which bears against the cylinder block downstream wall 56. A retaining ring 68 has external threads which mate with internal threads formed in downstream wall 56. Screwing retaining ring 68 into downstream wall 56 causes the ring to bear against cup 64 and to removably fix the cup in place. A circular recess 70 is provided in the interior cylindrical surface of cup 64 to accommodate a pulling tool in the event it is desired to substitute another cup 64. Cup 64 has generally cylindrical delivery passageways 72 formed therein which are aligned with cylinder block delivery passageways 62. It will be seen that cup passageways 72 are angled upstream as they approach the core rod 10 in order to deliver the tin to the core rod as close to the hollow mill cutter head 40 as possible. This close delivery location is another factor which minimizes the possibility of core rod contamination between milling and cladding.

It will be understood that the function of cup 64 is to deliver the tin from passageways 62 to the core rod surface and the cups are interchangeable in order to provide adjustability to both the location of the tin delivery and the diameter of the delivery passageways.

The upstream wall 20 of the cylinder block has a small recess formed at its central aperture to accommodate an O-ring seal 74. O-ring 74 seals the cylinder block wall 20 to the exterior wall of cup 64. O-ring seal 74 cooperates with seals 30 and 39 to prevent contamination of the just-milled core rod surface at the point where the rod passes from cutter head 40 into the upstream aperture of cup 64.

Cup 64 has a hollow interior on which internal threads are formed. An annular tin metering die 76 is seated within cup 64 and the die has a lip 78 which bears against the cup. A retaining ring 80 has external threads which mate with the internal threads of cup 64. Screwing retaining ring 80 into cup 64 causes the retaining ring to bear against lip 78 and to removably fix metering die 76 in place. A circular recess 82 is provided in the interior cylindrical surface of the metering die to accommodate a pulling tool in the event it is desired to substitute another metering die 76.

Although it is not specifically shown in the drawings, tin is introduced into cylinder 50 by an intake means. For example, tin could be continuously introduced into the cylinder through a feed line opening through the cylinder wall. Another means would be to construct the cylinder sufficiently large to permit a batch operation whereby the tin would be periodically delivered in bulk into the top end or through an opening in the side wall of the cylinder. In any case, an intake means must charge sufficient tin into cylinder 50 to permit a desired length of aluminum core rod 10 to be clad.

Figure 5:
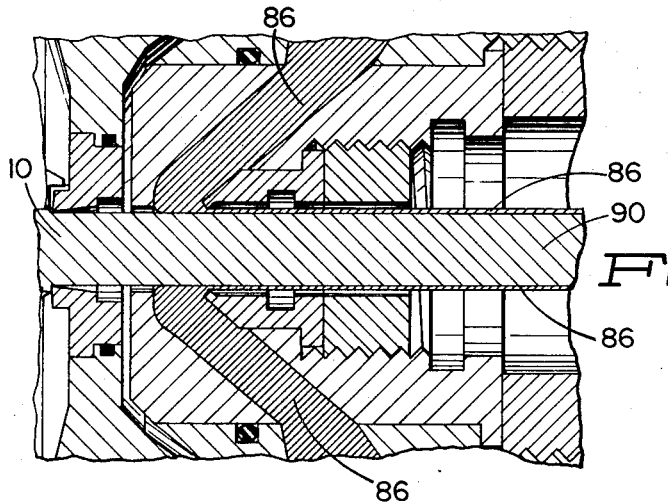
FIG. 5 is a view similar to FIG. 3 of the tin extrusion process in which the tin is applied to the core rod in a solid, plastic state.

Heating coils 84 are mounted within the downstream wall 56 of the cylinder block for the purpose of heating the tin contained within delivery passageway 62. Preferably, the heating units are electrically powered and raise the temperature of the cladding tin to approximately 250° to 300°F. which causes the tin to become more viscous. That is, the tin attains a solid but plastic state. FIG. 5 shows the tin cladding metal 86 in the solid plastic state at approximately 250° to 300°F. It will be understood that the tin does not have to be heated for the extrusion bonding to be accomplished. However, best results are produced when the tin is heated.

The ram 52, which is preferably hydraulic, applies continuous pressure to tin 86. For example, the ram preferably applies 10,000 to 20,000 p.s.i. As can be seen in FIG. 5, the ram pressure extrudes the tin through delivery passageways 62 and 72 into the cylinder block central aperture which has a hollow cylindrical chamber 88 through which moving core rod 10 concentrically travels. The metering die 76 has a circular upstream metering orifice which encircles and is slightly spaced from the core rod surface. The tin is extruded in a downstream direction through the orifice of metering die 76 into the annulus around the core rod 10 as shown in FIG. 5.

Another reason why the cup passageways 72 are angled upstream as they approach the core rod is to ensure that the extrusion bonding occurs as soon as possible after the core rod leaves guide bushing 18 and cutter head 40 where the rod is positively centered. After centering, the rod moves through the closely adjacent orifice of metering die 76 with a minimum of play developing to impair the desired orifice-rod concentric relationship.

Figure 4:
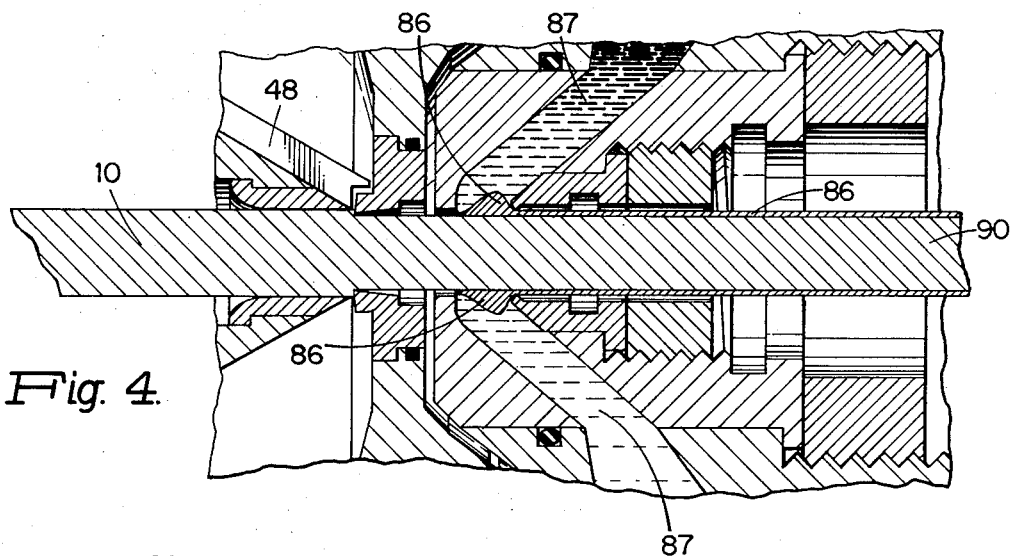
FIG. 4 is a view similar to FIG. 3 of the tin extrusion process in which the tin is heated to a molten state prior to being extruded.

An alternate embodiment of the process of this invention comprises raising the temperature of the cladding metal 86 above its melting point which, in the case of tin, is approximately 450°F. This temperature increase can be accomplished by the use of larger heating coils 84 or by various other means such as by adding an electrical resistance heating circuit to the apparatus shown in the drawings. The heating circuit includes an electrical power source, the moving core rod 10, the cladding material 86 and a high resistance portion of the cylinder block and its various passageways which would result in a high heat being applied to the tin. This would produce molten tin 87 having a temperature of approximately 475° to 600°F. This molten tin 87 "freezes" onto the moving core rod 10 and is extrusion bonded thereto in the manner shown in FIG. 4. It will be understood that the solid tin 86-molten tin 87 interface profile shown in FIG. 4 is primarily determined by the core rod speed. The higher the core rod speed, the flatter the profile.

After the tin cladding 86 has been extrusion bonded to the aluminum core rod 10 under heat and pressure in the cylinder block shown in FIG. 3, it is possible to conclude the process of this invention by coiling the clad rod 90 prior to subsequent wire drawing. However, it is preferable to employ one further process step to improve the extrusion bond and to simultaneously reduce the clad rod diameter.

For this purpose, after leaving the cylinder block, clad rod 90 enters a powered roll stand having two sets of powered reducing rolls. The first roll set has an upper roll 92 and a lower roll 94 with roll journals 96 and 98, respectively. The second roll set has a right side roll 100 and a left side roll (unshown) with roll journals 102 and (unshown), respectively, disposed at a 90° angle to roll journals 96 and 98.

The roll stand requires no roll heating to improve the bond qualities because of the residual heat of the moving clad rod. Preferably, the powered roll stand reduces the cross-sectional area of clad rod 90 approximately 10 to 35 percent between roll stand entry and exit. After passing through the roll stand, the clad rod 90 moves to a take-up coiler 104 where it is temporarily stored prior to wire drawing or other use. It is noteworthy that the process of this invention requires no sintering prior to wire drawing or at any other time. This fact provides a considerable economic advantage over other processes in current use.

It will be appreciated that other metals can be substituted for the tin cladding metal and the aluminum core rod of the preferred embodiment. Examples include, but are not limited to the following substitutes for the cladding material: lead, zinc, aluminum, tin-lead alloy, tin-zinc alloy, tin-silver alloy, tin-antimony alloy and copper-tin-bronze alloy. Examples include, but are not limited to the following substitutes for the core rod: aluminum alloy, copper, copper alloy, steel, nickel and nickel alloy.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

We claim:

1. The process of cladding a metal core rod with a dissimilar metal sheath, said process comprising the following steps:
   a. removing contaminants from the entire periphery of a moving length of round, metal core rod, said core rod having a principal constituent of aluminum;
   b. maintaining said core rod contaminant-free while said core rod is moved downstream;
   c. applying a thin annular sheath of cladding metal around the entire periphery of said contaminant-free core rod, said sheath having a principal constituent of tin; and
   d. solid-phase roll bonding said sheath to said core rod to produce a clad rod suitable for subsequent drawing into wire without subsequent heat treating or metal cutting operations on said clad rod.

2. The process of claim 1 wherein said core rod is aluminum and said cladding metal is tin.

3. The process of claim 1 wherein said cladding metal is applied by being annularly extruded around said core rod.

4. The process of claim 1 wherein said contaminants are removed by being rotary milled from the periphery of said core rod.

5. The process of claim 4 wherein said cladding metal is applied by being annularly extruded around said core rod.

6. The process of claim 1 wherein said contaminants are removed by being initially scored and subsequently rotary milled from the periphery of said core rod.

7. The process of claim 4 wherein the extrusion step is performed less than one second after the rotary milling step is performed.

8. The process of claim 1 wherein said core rod is maintained contaminant-free by preventing air from contacting the peripheral surface of said core rod.

9. The process of claim 1 wherein said core rod is maintained contaminant-free by completely surrounding said rod with a non-oxidizing gas.

10. The process of claim 1 wherein said solid phase roll bonding reduces the diameter of said clad rod by approximately 10 to 35 percent.

11. The process of claim 3 wherein said thin annular sheath of cladding metal is heated to a molten state prior to being extruded around said core rod.

12. The process of claim 3 wherein said thin annular sheath of cladding metal is maintained in a solid, plastic state prior to being extruded around said core rod.

* * * * *